United States Patent
Yeh et al.

(10) Patent No.: US 10,375,626 B2
(45) Date of Patent: Aug. 6, 2019

(54) METHOD AND APPARATUS FOR TRANSMITTING DOWNLINK RESPONSE TO UPLINK TRANSMISSION, AND METHOD AND APPARATUS FOR TRANSMITTING SYNCHRONIZATION SIGNAL

(71) Applicant: ELECTRONICS AND TELECOMMUNICATIONS RESEARCH INSTITUTE, Daejeon (KR)

(72) Inventors: Choongil Yeh, Daejeon (KR); JaeSheung Shin, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 127 days.

(21) Appl. No.: 15/399,294

(22) Filed: Jan. 5, 2017

(65) Prior Publication Data
US 2017/0201932 A1    Jul. 13, 2017

(30) Foreign Application Priority Data

Jan. 7, 2016  (KR) .................. 10-2016-0002275
Jan. 28, 2016  (KR) .................. 10-2016-0011005
Sep. 21, 2016  (KR) .................. 10-2016-0120962

(51) Int. Cl.
*H04W 48/12*  (2009.01)
*H04W 72/04*  (2009.01)
*H04W 88/02*  (2009.01)

(52) U.S. Cl.
CPC ......... *H04W 48/12* (2013.01); *H04W 72/042* (2013.01); *H04W 72/0413* (2013.01); *H04W 88/02* (2013.01)

(58) Field of Classification Search
None
See application file for complete search history.

(56) References Cited

U.S. PATENT DOCUMENTS 7,400,898 B2   7/2008  Kang et al.
8,522,103 B2   8/2013  Kim et al.
(Continued)

FOREIGN PATENT DOCUMENTS

KR    10-0754658 B1      9/2007
KR    10-2015-0087805 A  7/2015
WO    WO-2013/134272 A1  9/2013

OTHER PUBLICATIONS

3GPP TS 36.212 V13.2.0, 3$^{rd}$ Generation Partnership Project; Technical Specification Group Radio Access Network; Evolved Universal Terrestrial Radio Access (E-UTRA); Multiplexing and channel coding (Release 13), pp. 1-140, Jun. 2016.
(Continued)

*Primary Examiner* — Otis L Thompson, Jr.
(74) *Attorney, Agent, or Firm* — Rabin & Berdo, P.C.

(57) ABSTRACT

A base station determines whether a reception of each uplink signal transmitted by a plurality of terminals succeeds. The base station generates a response bit map representing whether the reception succeeds. Further, the base station transmits first downlink control information (DCI) including the response bit map to the plurality of terminals through a first downlink control channel.

14 Claims, 6 Drawing Sheets

(56) References Cited

U.S. PATENT DOCUMENTS

| | | | |
|---|---|---|---|
| 8,811,301 B2 | 8/2014 | Kim et al. | |
| 2011/0002273 A1* | 1/2011 | Youn | H04W 36/0055 |
| | | | 370/328 |
| 2012/0147846 A1* | 6/2012 | Ho | H04W 72/042 |
| | | | 370/330 |
| 2014/0105191 A1* | 4/2014 | Yang | H04L 1/1867 |
| | | | 370/336 |
| 2015/0195056 A1* | 7/2015 | He | H04J 3/1694 |
| | | | 370/280 |
| 2015/0264718 A1* | 9/2015 | Yu | H04W 72/02 |
| | | | 370/329 |
| 2016/0095076 A1* | 3/2016 | Xiong | H04W 4/70 |
| | | | 370/336 |
| 2016/0100421 A1* | 4/2016 | Ding | H04W 72/1268 |
| | | | 370/336 |
| 2016/0135170 A1* | 5/2016 | Chen | H04W 72/0413 |
| | | | 370/336 |
| 2016/0234787 A1* | 8/2016 | Liu | H04W 52/367 |
| 2016/0330768 A1* | 11/2016 | Hu | H04W 74/006 |
| 2017/0265169 A1* | 9/2017 | Chen | H04W 24/10 |
| 2018/0102890 A1* | 4/2018 | Yi | H04L 5/0037 |
| 2018/0123765 A1* | 5/2018 | Cao | H04L 1/1861 |
| 2018/0175974 A1* | 6/2018 | Wu | H04L 29/08 |
| 2018/0212735 A1* | 7/2018 | Munier | H04W 72/042 |
| 2018/0317213 A1* | 11/2018 | Islam | H04W 72/0406 |

OTHER PUBLICATIONS

R1-160123, "Considerations on control channels of NB-IOT", 3GPP TSG RAN WG1 NB-IOT Ad-Hoc Meeting, Budapest, Hungary, Jan. 18-20, 2016.

* cited by examiner

METHOD AND APPARATUS FOR TRANSMITTING DOWNLINK RESPONSE TO UPLINK TRANSMISSION, AND METHOD AND APPARATUS FOR TRANSMITTING SYNCHRONIZATION SIGNAL

CROSS-REFERENCE TO RELATED APPLICATION

This application claims priority to and the benefit of Korean Patent Application Nos. 10-2016-0002275, 10-2016-0011005, and 10-2016-0120962 filed in the Korean Intellectual Property Office on Jan. 7, 2016, Jan. 28, 2016, and Sep. 21, 2016, the entire contents of which are incorporated herein by reference.

BACKGROUND OF THE INVENTION (a) Field of the Invention

The present invention relates to a method and an apparatus for transmitting a response (for example, hybrid automatic repeat request (HARQ) acknowledgement/negative acknowledgement) to an uplink data transmission through a downlink.

Further, the present invention relates to a method and an apparatus for transmitting a synchronization signal.

(b) Description of the Related Art

When a base station responds to a plurality of uplink transmissions transmitted by a plurality of terminals, responses (for example, HARQ-ACK/NACK) to each uplink transmission need to be transmitted several times.

As a result, a resource may be used inefficiently and a signaling overhead problem may occur.

Therefore, a method for tying up, by a base station, a plurality of responses (for example, HARQ-ACK/NACK) to a plurality of uplink transmissions and transmitting the tied up responses at a time is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for tying up a plurality of responses to a plurality of uplink transmissions and transmitting the tied up responses at a time.

An exemplary embodiment of the present invention provides a transmitting method of a base station. The transmitting method of a base station includes: determining whether a reception of each uplink signal transmitted by a plurality of terminals succeeds; generating a response bit map representing whether the reception succeeds; and transmitting first downlink control information (DCI) including the response bit map to the plurality of terminals through a first downlink control channel.

The transmitting method may further include: transmitting a location of a bit for a first terminal among the plurality of terminals among a plurality of bits included in the response bit map to the first terminal using second DCI.

The transmitting method may further include: setting a location of a bit for a first terminal among the plurality of terminals among a plurality of bits included in the response bit map in the first terminal using radio resource control (RRC) signaling.

The transmitting method may further include: including a radio network temporary identifier (RNTI) for decoding of the first downlink control channel in second DCI for allocating an uplink resource for the transmission of the uplink signal.

The transmitting of the first DCI may include: scrambling a cyclic redundancy check (CRC) associated with the first DCI using the RNTI.

The transmitting method may further include: setting a radio network temporary identifier (RNTI) for decoding of the first downlink control channel in the plurality of terminals by radio resource control (RRC) signaling.

One narrowband subframe for a narrowband system to which the plurality of terminals belong may include a plurality of subframes.

A radio network temporary identifier (RNTI) for decoding of the first downlink control channel may be determined based on a function using a narrowband subframe number as an input variable.

The transmitting method may further include: transmitting second DCI including a radio network temporary identifier (RNTI) for decoding of the first downlink control channel through a second downlink control channel in a first narrowband subframe including a plurality of subframes for a narrowband system to which the plurality of terminals belong; and granting an uplink resource for the transmission of the uplink signal present in a second narrowband subframe subsequent to the first narrowband subframe to the plurality of terminals, using a third downlink control channel different from the second downlink control channel in the first narrowband subframe.

A coverage for a narrowband system to which the plurality of terminals belong may include a normal coverage, an extended coverage larger than the normal coverage, and an extreme coverage larger than the extended coverage.

A transmission time interval (TTI) for a first terminal belonging to the normal coverage among the plurality of terminals, a TTI for a second terminal belonging to the extended coverage, and a TTI for a third terminal belonging to the extreme coverage may be the same.

The transmitting method may further include: granting an uplink resource for a transmission of the uplink signal present in a second narrowband subframe subsequent to the first narrowband subframe to the plurality of terminals, using a second downlink control channel in a first narrowband subframe including a plurality of subframes for a narrowband system to which the plurality of terminals belong.

The transmitting of the first DCI may include: transmitting the first DCI to the plurality of terminals in a third narrowband subframe subsequent to the second narrowband subframe.

Each of a plurality of bits included in the response bit map may represent a hybrid automatic repeat request (HARQ)-acknowledgement (ACK) for the uplink signal.

Another exemplary embodiment of the present invention provides a transmitting method of a base station. The transmitting method of a base station includes: scheduling an uplink resource in a first terminal group belonging to a first coverage and a second terminal group belonging to a second coverage larger than the first coverage in different transmission time interval (TTI) units; generating a response bit map representing whether a reception of a plurality of uplink signals transmitted through the uplink resource succeeds; and transmitting the response bit map using a first downlink control channel.

A TTI for the first terminal group may correspond to one narrowband subframe including a plurality of subframes for a narrowband system.

A TTI for the second terminal group may correspond to a plurality of narrowband subframes.

The scheduling of the uplink resource may include: granting a first uplink resource present in a plurality of second narrowband subframes subsequent to the first narrowband subframe to the second terminal group, using a second downlink control channel in a first narrowband subframe including a plurality of subframes for a narrowband system.

The transmitting of the response bit map may include: transmitting downlink control information (DCI) including the response bit map to the second terminal group in a third narrowband subframe subsequent to the plurality of second narrowband subframes, using a common search space (CSS) for the first downlink control channel.

A hybrid automatic repeat request-acknowledgement-radio network temporary identifier (HARQ-ACK-RNTI) for decoding of the first downlink control channel may have different values per the first coverage and the second coverage.

A hybrid automatic repeat request-acknowledgement-radio network temporary identifier (HARQ-ACK-RNTI) for decoding of the first downlink control channel may be determined based on a value corresponding to a narrowband subframe number including a plurality of subframes for a narrowband system and a kind of coverage.

Yet another exemplary embodiment of the present invention provides a transmitting method of a base station. The transmitting method of a base station includes: generating a first synchronization signal sequence using a Zadoff-Chu sequence; generating a plurality of second synchronization signal sequences by cyclically shifting the first synchronization signal sequence; mapping the first synchronization signal sequence to a first time domain symbol among a plurality of time domain symbols belonging to a first subframe; and mapping each of the plurality of second synchronization signal sequences to a plurality of second time domain symbols among the plurality of time domain symbols belonging to the first subframe.

The transmitting method may further include: generating a third synchronization signal sequence that is a complex conjugate sequence of the first synchronization signal sequence; generating a plurality of fourth synchronization signal sequences by cyclically shifting the third synchronization signal sequence; mapping the third synchronization signal sequence to a third time domain symbol among a plurality of time domain symbols belonging to a second subframe in which the predetermined number of subframes elapses from the first subframe; and mapping each of the plurality of fourth synchronization signal sequences to a plurality of fourth time domain symbols among a plurality of time domain symbols belonging to the second subframe.

The first time domain symbol and the plurality of second time domain symbols may correspond to the rest time domain symbols other than first three time domain symbols among 14 time domain symbols belonging to the first subframe.

The generating of the first synchronization signal sequence may include: generating the first synchronization signal sequence using the Zadoff-Chu sequence of which the length is 11; and adding some of 11 elements belonging to the first synchronization signal sequence subsequent to a final element of the first synchronization signal sequence.

DETAILED DESCRIPTION OF THE EMBODIMENTS

Figure 1:
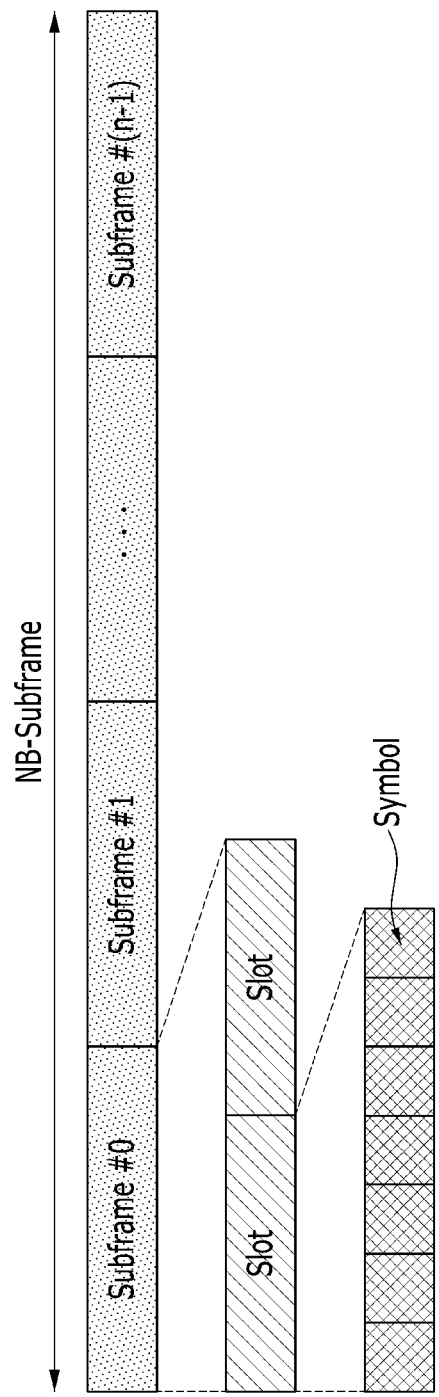
FIG. 1 is a diagram illustrating a narrowband (NB) subframe consisting of a plurality of long term evolution (LTE) subframes according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, the overlapping description of the same components will be omitted.

It is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, throughout the specification, a terminal may refer to a mobile terminal, a mobile station, an advanced mobile station, a high reliability mobile station, a subscriber station, a portable subscriber station, an access terminal, user equipment, and the like and may also include all or some of the functions of the terminal, the mobile terminal, the mobile station, the advanced mobile station, the high reliability mobile station, the subscriber station, the portable subscriber station, the access terminal, the user equipment, and the like.

Further, in the present specification, a base station (BS) may refer to an advanced base station, a high reliability base station, a nodeB, an evolved node B (eNodeB, eNB), an access point, a radio access station, a base transceiver station, a mobile multihop relay (MMR)-BS, a relay station serving as a base station, a high reliability relay station serving as a base station, a repeater, a macro base station, a small base station, and the like and may also include functions of all or some of the base station, the advanced base station, the HR-BS, the nodeB, the eNodeB, the access point, the radio access station, the base transceiver station, the MMR-BS, the relay station, the high reliability relay station, the repeater, the macro base station, the small base station, and the like.

The base station needs to tie up a plurality of responses (for example, HARQ-ACK/NACK) to uplink transmissions transmitted by a plurality of terminals and transmit the tied up responses at a time. Hereinafter, a configuration of a downlink control channel including a bit map for transmitting a plurality of responses (for example, HARQ-ACK/NACK) will be described.

The base station may tie up the plurality of responses (for example, HARQ-ACK/NACK) to the uplink transmissions transmitted by the plurality of terminals and transmit the tied up responses through a specific downlink control channel (for example, narrowband (NB) physical downlink control channel (PDCCH)) at a time. Hereinafter, in the exemplary embodiment of the present invention, the case in which the response transmitted by the base station is an HARQ response will be described as an example. This is only an example, and the exemplary embodiment of the present invention may be applied even to the case in which the response transmitted by the base station is a signal other than the HARQ response.

Downlink control information (DCI) transmitted through the NB-PDCCH may include the bit map and a specific bit of the bit map may transmit (indicate) the response (whether the reception succeeds, for example, HARQ-ACK) to the uplink transmission transmitted by a specific terminal among the plurality of terminals.

In the bit map, the terminal performing the uplink transmission may be notified a location of bit where the response (for example, HARQ-ACK) to its own uplink transmission is transmitted.

For scrambling a cyclic redundancy check (CRC) associated with the DCI, an HARQ-ACK-radio network temporary identifier (RNTI) may be used. The base station may determine the HARQ-ACK-RNTI for the CRC scrambling and notify the corresponding terminals of the determined HARQ-ACK-RNTI.

The base station may tie up the plurality of HARQ-ACKs and transmit the tied up HARQ-ACKs at a time through a specific downlink control channel (for example, NB-PDCCH), for the terminals grouped per coverage.

First, an NB subframe will be described with reference to FIG. 1.

FIG. 1 is a diagram illustrating a narrowband (NB) subframe consisting of a plurality of long term evolution (LTE) subframes according to an exemplary embodiment of the present invention.

The NB subframe includes a plurality of (for example, n) LTE subframes.

Each LTE subframe includes two time slots and each LTE time slot includes seven time domain symbols (for example, orthogonal frequency division multiplexing (OFDM) symbol). In the present specification, the case in which the time domain symbol is an OFDM symbol is described as an example, which is only an example. Even when the time domain symbol is not the OFDM symbol, the exemplary embodiment of the present invention may be applied.

The coverage for an NB internet of things (IOT) is divided into three (for example, a normal coverage, an extended coverage, and an extreme coverage). The extended coverage is larger than the normal coverage and the extreme coverage is larger than the extended coverage. In the present specification, the narrowband system (for example, NB IOT system) to which the base station and the terminal belong may be a system using a resource block of a predetermined bandwidth (for example, 180 KHz) or less.

The transmission time interval (TTI) is a minimum time unit in which a base station may schedule a user (terminal) to perform an uplink transmission or a downlink transmission. Hereinafter, the TTI of the NB-IOT is assumed to be the NB subframe.

If in the normal coverage, the TTI is one NB subframe, TTI bundling is required to secure link quality in the extended coverage or the extreme coverage. Therefore, the TTI for the extended coverage or the extreme coverage may also be set (or configured) to be a multiple of the NB subframe that is the TTI for the normal coverage.

A physical downlink control channel (PDCCH) is an LTE downlink control channel. The NB-PDCCH is a downlink control channel for the NB-IOT. The NB-PDCCH is a channel transmitting the downlink control information (DCI) and the cyclic redundancy check (CRC) associated with the DCI. The base station may perform downlink allocation, uplink grant, system information transmission, or the like to the terminal through the NB-PDCCH. The DCI includes the information associated therewith.

Next, a method (hereinafter, 'method M100') for identically setting TTI (hereinafter, 'NB-IOT TTI') for NB-IOT independent of coverage will be described.

If a length of the NB subframe is set to be sufficiently long, the same NB-IOT TTI may be set in all the terminals independent of a class (kind) of coverage in which the terminals are included. For example, when the coverage is the extreme coverage, a repetition may be mainly performed. This will be described in detail with reference to FIG. 2.

Figure 2:
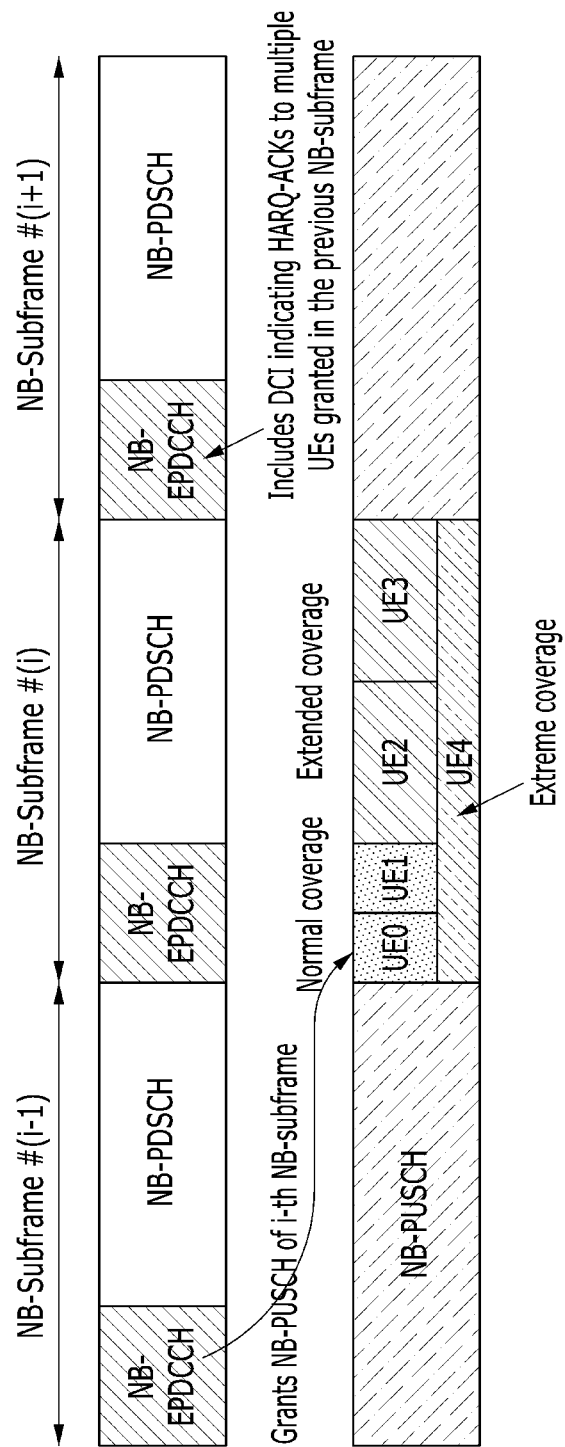
FIG. 2 is a diagram illustrating a method for transmitting an internet of things (NB-IOT) uplink grant and an HARQ-ACK according to an exemplary embodiment of the present invention.

FIG. 2 is a diagram illustrating a method for transmitting an internet of things (NB-IOT) uplink grant and an HARQ-ACK according to an exemplary embodiment of the present invention.

FIG. 2 illustrates continuous three NB subframes (i−1-th NB subframe, i-th NB subframe, and i+1-th NB subframe). Each NB subframe includes an NB-EPDCCH region and an NB-PDSCH region. FIG. 2 illustrates the case in which the NB-EPDCCH (enhanced PDCCH) is transmitted but the NB-PDCCH may be transmitted instead of the NB-EPD- CCH. Hereinafter, for convenience of explanation, the 'NB-PDCCH or NB-EPDCCH' is called the NB-PDCCH. FIG. 2 illustrates the case in which the NB-IOT TTI is one NB subframe independent of the class of coverage (normal coverage, extended coverage, and extreme coverage).

As illustrated in FIG. 2, the base station may use the NB-PDCCH present in the i−1-th NB subframe to grant (or allocate) an uplink resource present in the i-th NB subframe to a specific terminal. Here, the uplink resource may be a resource for an NB-physical uplink shared channel (NB-PUSCH). FIG. 2 illustrates the case in which a plurality of terminals UE0, UE1, UE2, UE3, and UE4 are granted the NB-PUSCH of the i-th NB subframe. Here, the terminals UE0 and UE1 are terminals within the normal coverage, the terminals UE2 and UE3 are terminals within the extended coverage, and the terminal UE4 is a terminal within the extreme coverage. The TTI for the terminals UE0 and UE1 included in the normal coverage, the TTI for the terminals UE2 and UE3 included in the extended coverage, and the TTI for the terminal UE4 included in the extreme coverage are the same and may be one NB subframe.

When the base station grants to the plurality of terminals (for example, UE0 to UE4) the NB-PUSCH of the i-th NB subframe in the i−1-th NB subframe, the corresponding terminals (for example, UE0 to UE4) may use the granted NB-PUSCH to perform the uplink transmission.

If the terminals (for example, UE0 to UE4) perform the uplink transmission in the i-th NB subframe, the base station determines whether the reception of the uplink signal transmitted by the terminals (for example, UE0 to UE4) succeeds. The base station may transmit the HARQ-ACKs for the uplink transmissions to the terminals (for example, UE0 to UE4) in the i+1-th NB subframe. In detail, the base station may use the NB-PDCCH of the i+1-th NB subframe to transmit the HARQ-ACKs for the uplink transmissions of the terminals (for example, UE0 to UE4) that is granted the NB-PUSCH of the i-th NB subframe. That is, the base station may use the simple method to transmit the plurality of HARQ-ACKs through a specific NB-PDCCH at a time.

In this case, the NB-PDCCH transmitted in the i+1-th NB subframe may include the DCI indicating the HARQ-ACKs for the uplink transmissions of the terminals (for example, UE0 to UE4) that are granted the NB-PUSCH of the i-th NB subframe. In detail, the DCI transmitted through the NB-PDCCH of the i+1-th NB subframe may include an HARQ-ACK bit map. The HARQ-ACK bit map transmits (indicates) whether the reception of the uplink signal (NB-PUSCH) transmitted by the terminals UE0 to UE4 in the i-th NB subframe succeeds. Further, the base station may scramble the CRC added to the DCI including the HARQ-ACK bit map using the specific value (for example, HARQ-ACK-RNTI).

Meanwhile, the terminals UE0 to UE4 should be able to decode the NB-PDCCH (transmit the DCI included in the HARQ-ACK bit map) in the i+1-th NB subframe. For this purpose, the corresponding terminals UE0 to UE4 should be able to know locations of bits corresponding to their own HARQ-ACK and the HARQ-ACK-RNTI among the bits of the HARQ-ACK bit map.

A method (hereinafter, 'method for specifying a location of bit') for specifying a location of specific bit among bits of the HARQ-ACK bit map is as follows.

For example, for the base station to grant the NB-PUSCH of the i-th NB subframe to the respective terminals UE0 to UE4, the locations of bits for the corresponding terminals UE0 to UE4 among the bits of the HARQ-ACK bit map may be included in the DCI (for example, DCI transmitted through the NB-PDCCH of the i−1-th NB subframe) transmitted in the i−1-th NB subframe.

As another example, the base station may set the locations of bits for the corresponding terminals UE0 to UE4 among the bits of the HARQ-ACK bit map in each of the terminals UE0 to UE4 by radio resource control (RRC) signaling.

A method for specifying HARQ-ACK-RNTI for decoding of NB-PDCCH is as follows.

For example, for the base station to grant the NB-PUSCH of the i-th NB subframe to the respective terminals UE0 to UE4, the HARQ-ACK-RNTI for the decoding of the NB-PDCCH may be included in the DCI (for example, DCI transmitted through the NB-PDCCH of the i−1-th NB subframe) transmitted in the i−1-th NB subframe.

As another example, the base station may set the HARQ-ACK-RNTI for the decoding of the NB-PDCCH in each of the terminals UE0 to UE4 using the RRC signaling.

As another example, the HARQ-ACK-RNTI for the decoding of the NB-PDCCH may have a preset value.

As another example, the HARQ-ACK-RNTI for the decoding of the NB-PDCCH may have a function value obtained by a function using an NB subframe number as an input variable. That is, the HARQ-ACK-RNTI for the decoding of the NB-PDCCH may be determined based on the NB subframe number.

As another example, the HARQ-ACK-RNTI for the decoding of the NB-PDCCH is common to the terminals UE0 to UE4, and therefore the base station may transmit the DCI including the HARQ-ACK-RNTI for decoding the NB-PDCCH using another NB-PDCCH (for example, NB-PDCCH different from the NB-PDCCH of the i−1-th NB subframe for granting the NB-PUSCH of the i−1-th NB subframe) transmitted in the i−1-th NB subframe.

Next, a method (hereinafter, 'method M200') for using different NB-IOT TTIs depending on coverage will be described.

Figure 3:
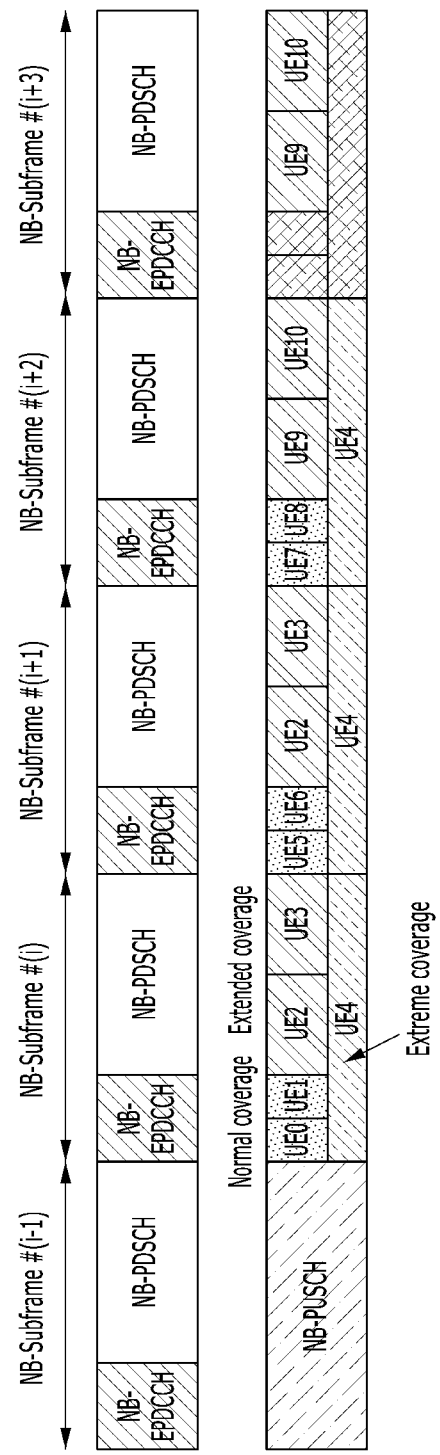
FIG. 3 is a diagram illustrating a method for using different transmission time intervals (TTIs) depending on a coverage according to an exemplary embodiment of the present invention.

FIG. 3 is a diagram illustrating a method for using different transmission time intervals (TTIs) depending on coverage according to an exemplary embodiment of the present invention. FIG. 3 illustrates continuous five NB subframes (i−1-th NB subframe, i-th NB subframe, i+1-th NB subframe, i+2-th NB subframe, and i+3-th NB subframe). Each NB subframe includes an NB-EPDCCH (NB-PDCCH) region and an NB-PDSCH region.

In FIG. 3, the terminals UE0, UE1, UE5, UE6, UE7, and UE8 are terminals within the normal coverage.

The TTIs of the terminals UE0, UE1, UE5, UE6, UE7, and UE8 within the normal coverage correspond to one NB subframe.

For example, if the base station grants NB-PUSCH resources for the terminals UE0 and UE1 using the NB-PDCCH in the i−1-th NB subframe, the terminals UE0 and UE1 transmit the uplink signal (NB-PUSCH) in the i-th NB subframe using the granted NB-PUSCH resource. The base station allows the terminals UE0 and UE1 to transmit the HARQ-ACKs for the NB-PUSCH transmitted in the i-th NB subframe using the HARQ-ACK bit map in the i+1-th NB subframe. In detail, the base station may use the NB-PDCCH of the i+1-th NB subframe to transmit the DCI including the HARQ-ACK bit map.

As another example, if the base station grants the NB-PUSCH resources for the terminals UE5 and UE6 in the i−1-th NB subframe, the terminals UE5 and UE6 use the granted NB-PUSCH resources to transmit the uplink signal (NB-PUSCH) in the i+1-th NB subframe. The base station transmits the HARQ-ACKs for the NB-PUSCH transmitted by the terminals UE5 and UE6 in the i+1-th NB subframe using the HARQ-ACK bit map in the i+2-th NB subframe.

As another example, if the base station grants the NB-PUSCH resources for the terminals UE7 and UE8 in the i+1-th NB subframe, the terminals UE7 and UE8 use the granted NB-PUSCH resources to transmit the uplink signal (NB-PUSCH) in the i+2-th NB subframe. The base station transmits the HARQ-ACKs for the NB-PUSCH transmitted by the terminals UE7 and UE8 in the i+2-th NB subframe using the HARQ-ACK bit map in the i+3-th NB subframe.

Meanwhile, in FIG. 3, the terminals UE2, UE3, UE9, and UE10 are terminals within the extended coverage.

The TTIs of the terminals UE2, UE3, UE9, and UE10 within the extended coverage correspond to K NB subframes. FIG. 3 illustrates the case of K=2.

For example, if the base station grants the NB-PUSCH resources for the terminals UE2 and UE3 in the i−1-th NB subframe, the terminals UE2 and UE3 use the granted NB-PUSCH resources to transmit the uplink signal (NB-PUSCH) in the i-th to i+1-th NB subframes. The base station transmits the HARQ-ACKs for the NB-PUSCH transmitted by the terminals UE2 and UE3 in the i-th to i+1-th NB subframes using the HARQ-ACK bit map in the i+2-th NB subframe.

As another example, if the base station grants the NB-PUSCH resources for the terminals UE9 and UE10 in the i+1-th NB subframe, the terminals UE2 and UE3 use the granted NB-PUSCH resources to transmit the uplink signal (NB-PUSCH) in the i+2-th to i+3-th NB subframes. The base station transmits the HARQ-ACKs for the NB-PUSCH transmitted by the terminals UE9 and UE10 in the i+2-th to i+3-th NB subframes using the HARQ-ACK bit map in the i+4-th NB subframe.

Meanwhile, in FIG. 3, the terminal UE4 is a terminal within the extreme coverage.

The TTI of the terminal UE4 within the extreme coverage corresponds to L NB subframes. FIG. 3 illustrates the case of L=3.

For example, if the base station grants the NB-PUSCH resource for the terminal UE4 in the i−1-th NB subframe, the terminal UE4 uses the granted NB-PUSCH resource to transmit the uplink signal (NB-PUSCH) in the i-th to i+2-th NB subframes.

The base station transmits the HARQ-ACK for the NB-PUSCH transmitted by the terminal UE4 in the i-th to i+2-th NB subframes using the HARQ-ACK bit map in the i+3-th NB subframe.

The long TTI used for the case of the extended coverage or the extreme coverage is similar to the case in which the same TTI is bundled.

When K=L=1, the TTI may correspond to one NB subframe independent of the classes of coverage (normal coverage, extended coverage, extreme coverage).

The base station may tie up the HARQ-ACKs for the plurality of uplink transmissions transmitted by the terminals and transmit the tied up HARQ-ACKs at a time.

For example, the base station may transmit the two HARQ-ACKs for the two uplink transmissions transmitted by the two terminals UE0 and UE1 through one specific NB-PDCCH. In this case, the region in which the NB-PDCCH (NB-PDCCH transmitting the HARQ-ACK) may be a common search space (CSS).

The region in which the NB-PDCCH is transmitted is divided into the CSS and a user-specific search space (USS). When there is a need to transmit the same DCI to the plurality of terminals, the NB-PDCCH is transmitted through the CSS, or in another case (for example, unicast) the NB-PDCCH is transmitted through the USS.

Meanwhile, a communication procedure for the method (method M200) for using different NB-IOT TTIs depending on classes of coverage (normal coverage, extended coverage, extreme coverage) is as follows.

The base station groups the terminals per coverage.

The base station may perform the scheduling (uplink resource allocation) on the terminal within the normal coverage in a unit of one NB subframe (TTI for the normal coverage). The base station may perform the scheduling on the terminal within the extended coverage in a unit of K NB subframes (TTI for the extended coverage). The base station may perform the scheduling on the terminal within the extreme coverage in a unit of L NB subframes (TTI for the extreme coverage).

The base station may differently set the HARQ-ACK-RNTI value for scrambling the CRC associated with the DCI (DCI including the HARQ-ACK bit map) per coverage. A method for setting an HARQ-ACK-RNTI value is as follows.

For example, for the base station to grant the NB-PUSCH of at least one NB subframe considering the i-th NB subframe as a start to the respective terminals, the HARQ-ACK-RNTI may be included in the DCI (for example, DCI transmitted through the NB-PDCCH of the i−1-th NB subframe) transmitted in the i−1-th NB subframe As another example, the base station may set the HARQ-ACK-RNTI in each of the terminals using the RRC signaling.

As another example, the HARQ-ACK-RNTI has a preset value and may have different values per coverage.

As another example, the HARQ-ACK-RNTI may have a function value obtained by a function using values (for example, normal coverage=1, extended coverage=2, extreme coverage=3) corresponding to the NB subframe number and the classes of coverage as an input variable. That is, the HARQ-ACK-RNTI may be determined based on the values corresponding to the NB subframe number and the classes (for example, classes of coverage to which the terminal receiving the HARQ-ACK bit map belongs) of coverage.

As another example, if the base station grants the NB-PUSCH of at least one NB subframe considering the i-th NB subframe as a start to the terminals having the same class of coverage, the corresponding terminals may transmit the DCI including the commonly used HARQ-ACK-RNTI using another NB-PDCCH (for example, NB-PDCCH different from the NB-PDCCH of the i−1-th NB subframe for the grant of the NB-PUSCH of the i-th NB subframe) transmitted in the i−1-th NB subframe.

Meanwhile, the method for specifying a location of bit described in the method M100 may be applied similarly or identically to the M200.

Next, a method for designing a primary synchronization signal (PSS) for NB-IOT will be described.

The NB-PSS is not a synchronization signal divided per cell. Of course, although a waveform may be changed according to modes (for example, in-band mode, stand-alone mode, guard band mode), the waveforms of the NB-PSS transmitted in cells of the same mode are the same.

Figure 4:
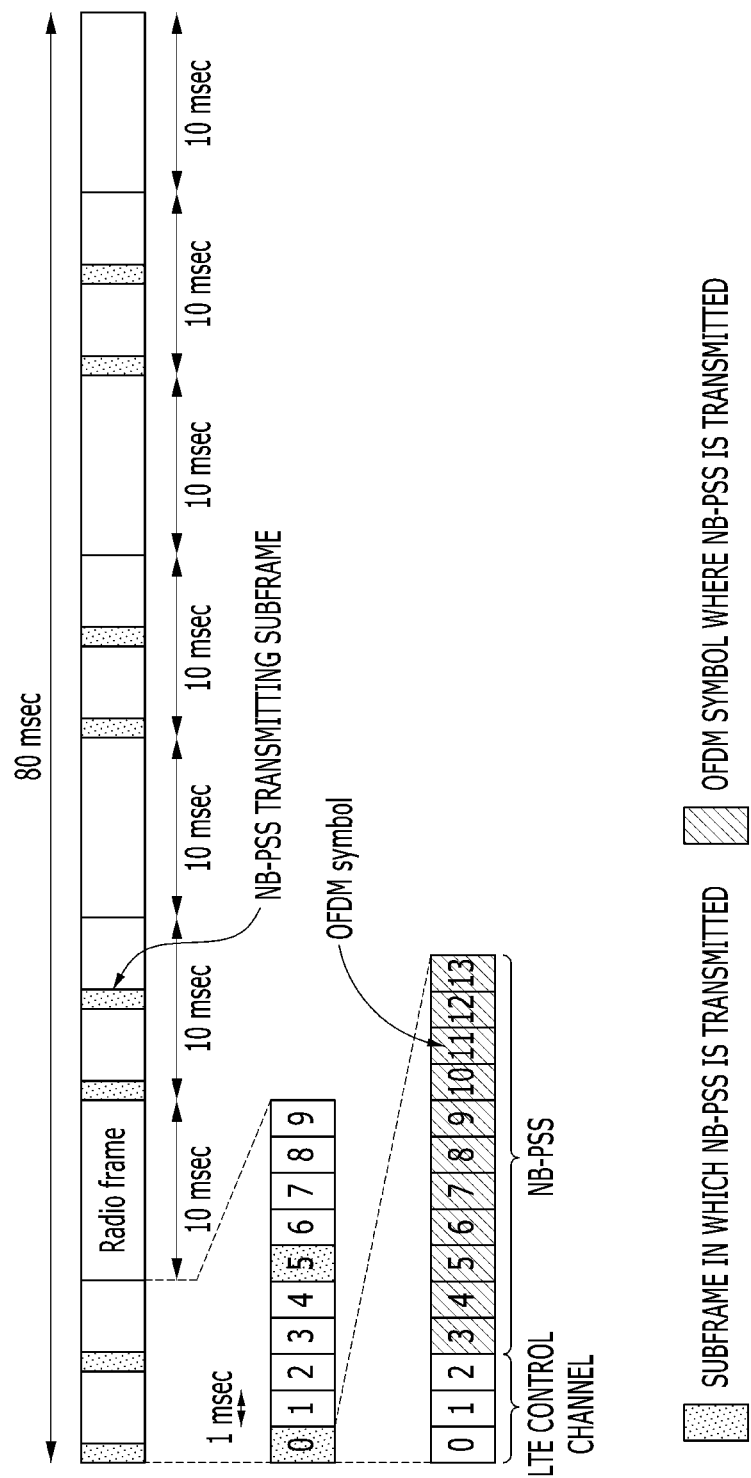
FIG. 4 is a diagram illustrating a subframe in which a primary synchronization signal (NB-PSS) is transmitted and a location of an orthogonal frequency division multiplexing (OFDM) symbol within the corresponding subframe, according to an exemplary embodiment of the present invention.

FIG. 4 is a diagram illustrating a subframe in which a primary synchronization signal (NB-PSS) is transmitted and a location of an orthogonal frequency division multiplexing (OFDM) symbol within the corresponding subframe, according to an exemplary embodiment of the present invention. That is, FIG. 4 illustrates a transmission location of the NB-PSS.

FIG. 4 illustrates eight LTE radio frames. Each of the LTE radio frames (10 ms) includes 10 LTE subframes. Each of the LTE subframes (1 ms) includes 14 OFDM symbols.

FIG. 4 illustrates the case in which the NB-PSS is transmitted in a first radio frame, a third radio frame, a fifth radio frame, and a seventh radio frame among eight radio frames. Hereinafter, the radio frame in which the NB-PSS is transmitted is called the NB-PSS frame.

In detail, FIG. 4 illustrates the case in which the NB-PSS is transmitted in subframe No. 0 and subframe No. 5 among 10 subframes included in the NB-PSS frame. Hereinafter, the subframe in which the NB-PSS is transmitted is called the NB-PSS subframe. However, this is only an example. The predetermined number of subframes elapses from the NB-PSS subframe and the NB-PSS subframe and then the NB-PSS subframe may be different from the exemplary embodiment (NB-PSS subframe No. 0, NB-PSS subframe No. 5) of FIG. 4.

In more detail, FIG. 4 illustrates the case in which OFDM symbols Nos. 3 to 13 among 14 OFDM symbols included in the NB-PSS subframe are used for the NB-PSS transmission. Hereinafter, the OFDM symbol used for the NB-PSS transmission is called the NB-PSS OFDM symbol. The rest OFDM symbols (OFDM symbols Nos. 0 to 2) other than the NB-PSS OFDM symbol among 14 OFDM symbols included in the NB-PSS subframe may be used for LTE control channel transmission.

Figure 5:
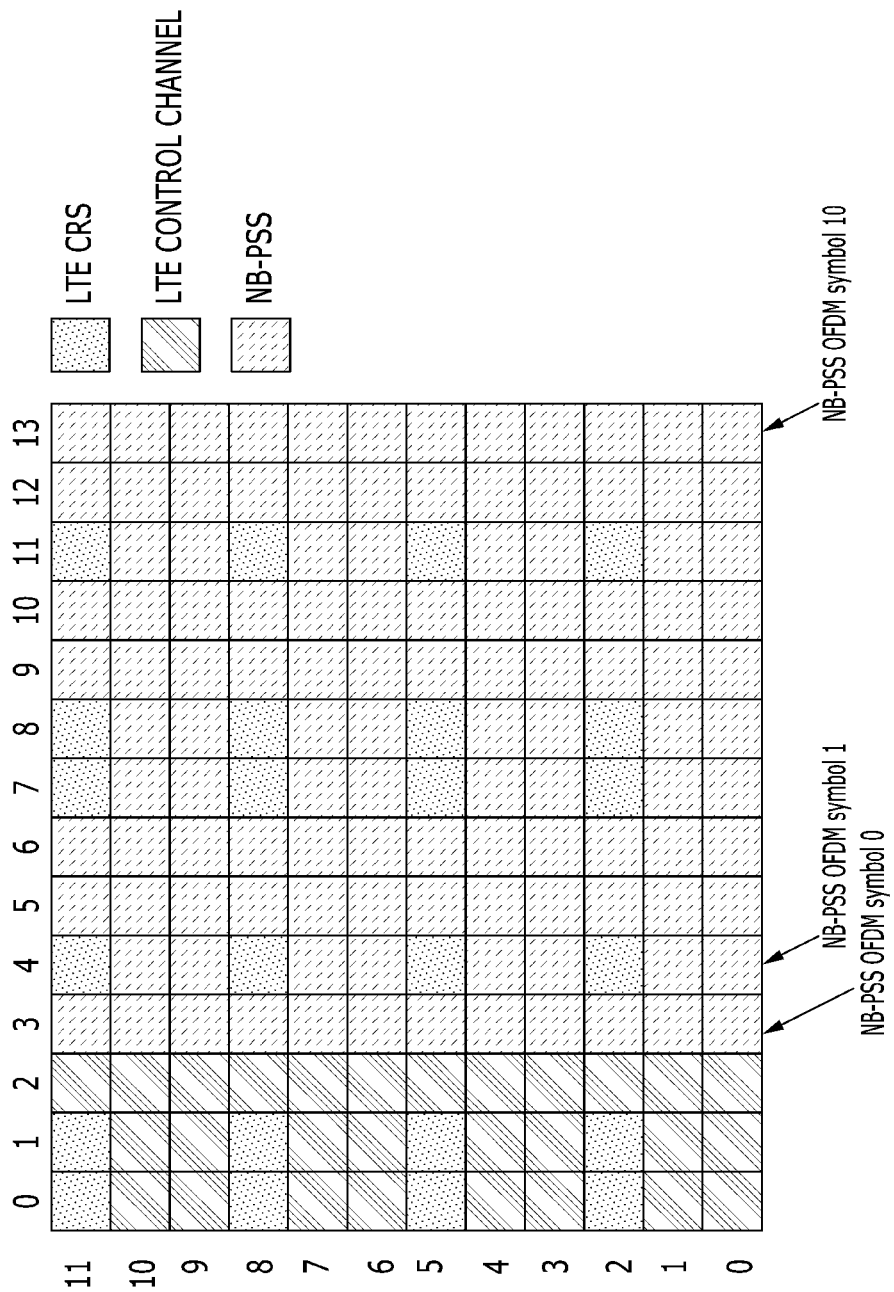
FIG. 5 is a diagram illustrating a resource that may be used by the NB-PSS, according to an exemplary embodiment of the present invention.

FIG. 5 is a diagram illustrating a resource that may be used by the NB-PSS, according to an exemplary embodiment of the present invention.

As described above, the first three OFDM symbols Nos. 0 to 2 among 14 OFDM symbols included in the LTE subframe are used for the LTE control channel transmission.

Therefore, as illustrated in FIG. 5, the OFDM symbol that may be actually used for the NB-PSS transmission among the OFDM symbols included in the subframe (NB-PSS subframe) designated for the purpose of the NB-PSS transmission is final eleven OFDM symbols (i.e., NB-PSS OFDM symbols Nos. 0 to 10). As illustrated in FIG. 5, the OFDM symbols Nos. 3 to 13 among 14 OFDM symbols included in the NB-PSS subframe correspond to the NB-PSS OFDM symbols Nos. 0 to 10. However, the case in which a plurality of NB-PSS OFDM symbols are 11 is only an example. The number of NB-PSS OFDM symbols may be values other than 11.

The LTE control channel is mapped to the rest remote elements (REs) other than an RE for an LTE cell-specific reference signal (LTE CRS) among a plurality of REs.

The NB-PSS is mapped to the rest REs other than the RE for the LTE CRS among the plurality of REs corresponding to OFDM symbols No. 3 to 13 (that is, NB-PSS OFDM symbols No. 0 to 10).

Next, a method for generating a sequence for an NB-PSS waveform will be described.

An NB-PSS OFDM symbol includes 12 REs.

The base station generates a specific Zadoff-Chu sequence $\{c_0, c_1, c_2, \ldots, c_{10}\}$ of which the length is 11.

The base station generates a complex conjugate sequence $\{c^*_0, c^*_1, c^*_2, \ldots, c^*_{10}\}$ of the Zadoff-Chu sequence $\{c_0, c_1, c_2, \ldots, c_{10}\}$.

The base station may generate cyclic shift version sequences of the sequence $\{c_0, c_1, c_2, \ldots, c_{10}\}$ and cyclic shift version sequences of the sequence $\{c^*_0, c^*_1, c^*_2, \ldots, c^*_{10}\}$. For example, the base station may cyclically shift Zadoff-Chu sequence $\{c_0, c_1, c_2, \ldots, c_{10}\}$ twice to generate a sequence $\{c_2, c_3, c_4, \ldots, c_1\}$ and may cyclically shift the sequence $\{c^*_0, c^*_1, c^*_2, \ldots, c^*_{10}\}$ twice to generate $\{c^*_2, c^*_3, c^*_4, \ldots, c^*_1\}$.

The base station maps the generated sequence to the RE configuring the NB-PSS OFDM symbol. In detail, the base station may map the Zadoff-Chu sequence $\{c_0, c_1, c_2, \ldots, c_{10}\}$, the cyclic shift version sequence of the Zadoff-Chu sequence $\{c_0, c_1, c_2, \ldots, c_{10}\}$, the complex conjugate sequence $\{c^*_0, c^*_1, c^*_2, \ldots, c^*_{10}\}$, or the cyclic shift version sequence of the complex conjugate sequence $\{c^*_0, c^*_1, c^*_2, \ldots, c^*_{10}\}$ to the RE configuring the NB-PSS OFDM symbol.

The base station does not allocate a sequence element to the RE mapped (corresponding) to a direct current (DC).

If there is the RE used for the LTE CRS among the REs configuring the NB-PSS OFDM symbol, the base station does not transmit the sequence element mapped to the corresponding RE (puncturing).

For example, the sequences mapped to the NB-PSS OFDM symbols of each of the NB-PSS subframe No. 0 and the NB-PSS subframe No. 5 are as the following Table 1.

TABLE 1

| NB-PSS subframe # | NB-PSS OFDM symbol # | mapping sequence | Remarks |
|---|---|---|---|
| No. 0 | No. 0 | $\{c_0, c_1, c_2, \ldots, c_{10}\}$ | no cyclic shifted |
|  | No. 1 | $\{c_1, c_2, c_3, \ldots, c_0\}$ | 1 cyclic shifted |
|  | No. 2 | $\{c_2, c_3, c_4, \ldots, c_1\}$ | 2 cyclic shifted |
|  | No. 3 | $\{c_3, c_4, c_5, \ldots, c_2\}$ | 3 cyclic shifted |
|  | No. 4 | $\{c_4, c_5, c_6, \ldots, c_3\}$ | 4 cyclic shifted |
|  | No. 5 | $\{c_5, c_6, c_7, \ldots, c_4\}$ | 5 cyclic shifted |
|  | No. 6 | $\{c_6, c_7, c_8, \ldots, c_5\}$ | 6 cyclic shifted |
|  | No. 7 | $\{c_7, c_8, c_9, \ldots, c_6\}$ | 7 cyclic shifted |
|  | No. 8 | $\{c_8, c_9, c_{10}, \ldots, c_7\}$ | 8 cyclic shifted |
|  | No. 9 | $\{c_9, c_{10}, c_0, \ldots, c_8\}$ | 9 cyclic shifted |
|  | No. 10 | $\{c_{10}, c_0, c_1, \ldots, c_9\}$ | 10 cyclic shifted |
| No. 5 | No. 0 | $\{c\_0\hat{\ }*, c\_1\hat{\ }*, c\_2\hat{\ }*, \ldots, c\_10\hat{\ }*\}$ | no cyclic shifted |
|  | No. 1 | $\{c\_1\hat{\ }*, c\_2\hat{\ }*, c\_3\hat{\ }*, \ldots, c\_0\hat{\ }*\}$ | 1 cyclic shifted |
|  | No. 2 | $\{c\_2\hat{\ }*, c\_3\hat{\ }*, c\_4\hat{\ }*, \ldots, c\_1\hat{\ }*\}$ | 2 cyclic shifted |
|  | No. 3 | $\{c\_3\hat{\ }*, c\_4\hat{\ }*, c\_5\hat{\ }*, \ldots, c\_2\hat{\ }*\}$ | 3 cyclic shifted |
|  | No. 4 | $\{c\_4\hat{\ }*, c\_5\hat{\ }*, c\_6\hat{\ }*, \ldots, c\_3\hat{\ }*\}$ | 4 cyclic shifted |
|  | No. 5 | $\{c\_5\hat{\ }*, c\_6\hat{\ }*, c\_7\hat{\ }*, \ldots, c\_4\hat{\ }*\}$ | 5 cyclic shifted |
|  | No. 6 | $\{c\_6\hat{\ }*, c\_7\hat{\ }*, c\_8\hat{\ }*, \ldots, c\_5\hat{\ }*\}$ | 6 cyclic shifted |
|  | No. 7 | $\{c\_7\hat{\ }*, c\_8\hat{\ }*, c\_9\hat{\ }*, \ldots, c\_6\hat{\ }*\}$ | 7 cyclic shifted |
|  | No. 8 | $\{c\_8\hat{\ }*, c\_9\hat{\ }*, c\_10\hat{\ }*, \ldots, c\_7\hat{\ }*\}$ | 8 cyclic shifted |
|  | No. 9 | $\{c\_9\hat{\ }*, c\_10\hat{\ }*, c\_0\hat{\ }*, \ldots, c\_8\hat{\ }*\}$ | 9 cyclic shifted |
|  | No. 10 | $\{c\_10\hat{\ }*, c\_0\hat{\ }*, c\_1\hat{\ }*, \ldots, c\_9\hat{\ }*\}$ | 10 cyclic shifted |

In the present specification, $c\_0\hat{\ }*, c\_1\hat{\ }*, c\_2\hat{\ }*, \ldots, c\_10\hat{\ }*$ represent $c^*_0, c^*_1, c^*_2, \ldots, c^*_{10}$.

Meanwhile, unlike the mapping method shown in the above Table 1, as shown in the following Table 2, the base station may map the complex conjugate sequence to the NB-PSS subframe No. 0 and map an original sequence to which the complex conjugate is not applied to the NB-PSS subframe No. 5.

TABLE 2

| NB-PSS subframe # | NB-PSS OFDM symbol # | mapping sequence | Remarks |
|---|---|---|---|
| No. 5 | No. 0 | $\{c_0, c_1, c_2, \ldots, c_{10}\}$ | no cyclic shifted |
|  | No. 1 | $\{c_1, c_2, c_3, \ldots, c_0\}$ | 1 cyclic shifted |
|  | No. 2 | $\{c_2, c_3, c_4, \ldots, c_1\}$ | 2 cyclic shifted |
|  | No. 3 | $\{c_3, c_4, c_5, \ldots, c_2\}$ | 3 cyclic shifted |
|  | No. 4 | $\{c_4, c_5, c_6, \ldots, c_3\}$ | 4 cyclic shifted |
|  | No. 5 | $\{c_5, c_6, c_7, \ldots, c_4\}$ | 5 cyclic shifted |
|  | No. 6 | $\{c_6, c_7, c_8, \ldots, c_5\}$ | 6 cyclic shifted |
|  | No. 7 | $\{c_7, c_8, c_9, \ldots, c_6\}$ | 7 cyclic shifted |
|  | No. 8 | $\{c_8, c_9, c_{10}, \ldots, c_7\}$ | 8 cyclic shifted |
|  | No. 9 | $\{c_9, c_{10}, c_0, \ldots, c_8\}$ | 9 cyclic shifted |
|  | No. 10 | $\{c_{10}, c_0, c_1, \ldots, c_9\}$ | 10 cyclic shifted |
| No. 0 | No. 0 | $\{c\_0\hat{\,}^*, c\_1\hat{\,}^*, c\_2\hat{\,}^*, \ldots, c\_10\hat{\,}^*\}$ | no cyclic shifted |
|  | No. 1 | $\{c\_1\hat{\,}^*, c\_2\hat{\,}^*, c\_3\hat{\,}^*, \ldots, c\_0\hat{\,}^*\}$ | 1 cyclic shifted |
|  | No. 2 | $\{c\_2\hat{\,}^*, c\_3\hat{\,}^*, c\_4\hat{\,}^*, \ldots, c\_1\hat{\,}^*\}$ | 2 cyclic shifted |
|  | No. 3 | $\{c\_3\hat{\,}^*, c\_4\hat{\,}^*, c\_5\hat{\,}^*, \ldots, c\_2\hat{\,}^*\}$ | 3 cyclic shifted |
|  | No. 4 | $\{c\_4\hat{\,}^*, c\_5\hat{\,}^*, c\_6\hat{\,}^*, \ldots, c\_3\hat{\,}^*\}$ | 4 cyclic shifted |
|  | No. 5 | $\{c\_5\hat{\,}^*, c\_6\hat{\,}^*, c\_7\hat{\,}^*, \ldots, c\_4\hat{\,}^*\}$ | 5 cyclic shifted |
|  | No. 6 | $\{c\_6\hat{\,}^*, c\_7\hat{\,}^*, c\_8\hat{\,}^*, \ldots, c\_5\hat{\,}^*\}$ | 6 cyclic shifted |
|  | No. 7 | $\{c\_7\hat{\,}^*, c\_8\hat{\,}^*, c\_9\hat{\,}^*, \ldots, c\_6\hat{\,}^*\}$ | 7 cyclic shifted |
|  | No. 8 | $\{c\_8\hat{\,}^*, c\_9\hat{\,}^*, c\_10\hat{\,}^*, \ldots, c\_7\hat{\,}^*\}$ | 8 cyclic shifted |
|  | No. 9 | $\{c\_9\hat{\,}^*, c\_10\hat{\,}^*, c\_0\hat{\,}^*, \ldots, c\_8\hat{\,}^*\}$ | 9 cyclic shifted |
|  | No. 10 | $\{c\_10\hat{\,}^*, c\_0\hat{\,}^*, c\_1\hat{\,}^*, \ldots, c\_9\hat{\,}^*\}$ | 10 cyclic shifted |

The combination of the sequences shown in the above Table 1 or 2 is only an example in which the relationship between the location of the NB-PSS OFDM symbol and the mapped NB-PSS sequence (cyclic-shifted Zadoff-Chu sequence) is shown.

The cyclic shift value mapped to the NB-PSS OFDM symbol may also be defined as the following Table 3 (sequence mapped to the NB-PSS OFDM symbol).

TABLE 3

| NB-PSS OFDM symbol # | Cyclic shift |
|---|---|
| 0 | 6 |
| 1 | 8 |
| 2 | 1 |
| 3 | 4 |
| 4 | 3 |
| 5 | No shift |
| 6 | 10 |
| 7 | 7 |
| 8 | 9 |
| 9 | 2 |
| 10 | 5 |

The combination of the sequences described in the above Tables 1 to 3 is only an example, and the combination of the sequences different therefrom may also be used. That is, all the combinations of the sequences may be made and therefore the base station may use one of several combinations of the sequences as a sequence for the generation of the NB-PSS waveform.

Meanwhile, when the base station allocates the sequence element even to the RE mapped to the DC, the Zadoff-Chu sequence of which the length is 11 may be repeatedly used as necessary. For example, the base station may use the sequence $\{c_0, c_1, c_2, \ldots, c_{10}, c_0\}$ to which an element $C_0$ is added and the sequence $\{c^*_0, c^*_1, c^*_2, \ldots, c^*_{10}\}$ to which an element $c^*_0$ is added when the number of additionally required sequence elements for the RE mapped to the DC is one.

A method for mapping a cyclic shifted sequence to an NB-PSS OFDM symbol after a generation of sequence is the same as or similar to the foregoing mapping method for the case in which the RE mapped to the DC is not used.

Figure 6:
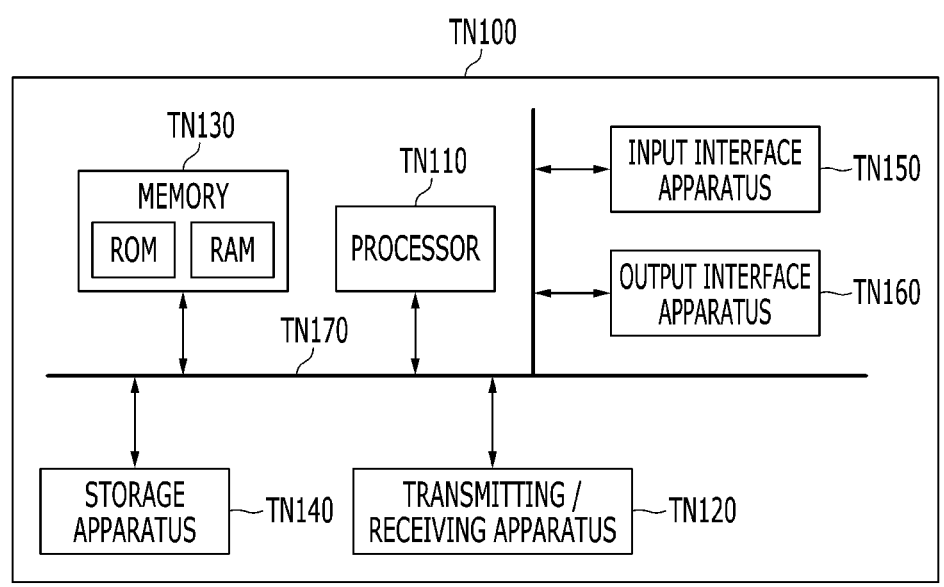
FIG. 6 is a diagram illustrating a wireless device (or communication node) according to an exemplary embodiment of the present invention.

FIG. 6 is a diagram illustrating a wireless device (or communication node) according to an exemplary embodiment of the present invention. A wireless device TN100 of FIG. 6 may be the base station, the terminal, or the like described in the present specification and may be a transmitter or a receiver.

In the exemplary embodiment of FIG. 6, the wireless device TN100 may include at least one processor TN110, a transmitting/receiving apparatus (device) TN120 connected to a network to perform communication, and a memory TN130. Further, the wireless device TN100 may further include a storage apparatus (device) TN140, an input interface apparatus (device) TN150, an output interface apparatus (device) 160, or the like. Components included in the wireless device TN100 may be connected to each other by a bus TN170 to communicate with each other.

The processor TN110 may run a program command that is stored in at least one of the memory TN130 and the storage apparatus TN140. The processor TN110 may mean a central processing unit (CPU), a graphics processing unit (GPU), or an exclusive processor that performs the methods according to the exemplary embodiments of the present invention. The processor TN110 may be configured to implement the procedures, the functions, and the methods described with reference to the exemplary embodiment of the present invention. The processor TN110 may control each of the components of the wireless device TN100.

The memory TN130 and the storage apparatus TN140 may each store various information associated with the operation of the processor TN110. The memory TN130 and the storage apparatus TN140 may each be configured of at least one of a volatile storage medium and a non-volatile storage medium. For example, the memory TN130 may be configured of at least one of a read only memory (ROM) and a random access memory (RAM).

The transmitting/receiving apparatus TN120 may transmit or receive a wired signal or a wireless signal. Further, the wireless device TN100 may have a single antenna or multiple antennas.

According to an exemplary embodiment of the present invention, the base station may tie up the plurality of responses (for example, HARQ-ACK/NACK) to the uplink transmissions transmitted by the plurality of terminals and transmit the tied up responses at a time. As a result, it is possible to improve the resource efficiency and the transmitting efficiency and improve the signaling overhead.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitting method of a base station, comprising:
   determining whether a reception of each uplink signal transmitted by a plurality of terminals succeeds;
   generating a response bit map representing whether the reception succeeds; and
   transmitting first downlink control information (DCI) including the response bit map to the plurality of terminals through a first downlink control channel;
   wherein one narrowband subframe for a narrowband system to which the plurality of terminals belong includes a plurality of subframes, and
   a radio network temporary identifier (RNTI) for decoding of the first downlink control channel is determined based on a narrowband subframe number.

2. The transmitting method of claim 1, further comprising:
   transmitting a location of a bit for a first terminal among the plurality of terminals among a plurality of bits included in the response bit map to the first terminal using second DCI.

3. The transmitting method of claim 1, further comprising:
   setting a location of a bit for a first terminal among the plurality of terminals among a plurality of bits included in the response bit map in the first terminal using radio resource control (RRC) signaling.

4. The transmitting method of claim 1, further comprising:
   including a radio network temporary identifier (RNTI) for decoding of the first downlink control channel in second DCI for allocating an uplink resource for a transmission of the uplink signal,
   wherein the transmitting of the first DCI includes:
   scrambling a cyclic redundancy check (CRC) associated with the first DCI using the RNTI.

5. The transmitting method of claim 1, further comprising:
   setting a radio network temporary identifier (RNTI) for decoding of the first downlink control channel in the plurality of terminals by radio resource control (RRC) signaling.

6. The transmitting method of claim 1, further comprising:
   transmitting second DCI including a radio network temporary identifier (RNTI) for decoding of the first downlink control channel through a second downlink control channel in a first narrowband subframe including a plurality of subframes for a narrowband system to which the plurality of terminals belong; and
   granting an uplink resource for a transmission of the uplink signal present in a second narrowband subframe subsequent to the first narrowband subframe to the plurality of terminals, using a third downlink control channel different from the second downlink control channel in the first narrowband subframe.

7. The transmitting method of claim 1, wherein:
   a coverage for a narrowband system to which the plurality of terminals belong includes a normal coverage, an extended coverage larger than the normal coverage, and an extreme coverage larger than the extended coverage, and
   a transmission time interval (TTI) for a first terminal belonging to the normal coverage among the plurality of terminals, a TTI for a second terminal belonging to the extended coverage, and a TTI for a third terminal belonging to the extreme coverage are the same.

8. The transmitting method of claim 1, further comprising:
   granting an uplink resource for a transmission of the uplink signal present in a second narrowband subframe subsequent to a first narrowband subframe to the plurality of terminals, using a second downlink control channel in the first narrowband subframe including a plurality of subframes for a narrowband system to which the plurality of terminals belong,
   wherein the transmitting of the first DCI includes:
   transmitting the first DCI to the plurality of terminals in a third narrowband subframe subsequent to the second narrowband subframe.

9. The transmitting method of claim 1, wherein:
   each of a plurality of bits included in the response bit map represents a hybrid automatic repeat request (HARQ)-acknowledgement (ACK) for the uplink signal.

10. A transmitting method of a base station, comprising:
    scheduling an uplink resource in a first terminal group belonging to a first coverage and a second terminal group belonging to a second coverage larger than the first coverage in different transmission time interval (TTI) units;
    generating a response bit map representing whether a reception of a plurality of uplink signals transmitted through the uplink resource succeeds; and
    transmitting the response bit map using a first downlink control channel,
    wherein a TTI for the first terminal group corresponds to one narrowband subframe including a plurality of subframes, and
    a TTI for the second terminal group corresponds to a plurality of narrowband subframes.

11. The transmitting method of claim 10, wherein:
    a hybrid automatic repeat request-acknowledgement-radio network temporary identifier (HARQ-ACK-RNTI)

for decoding of the first downlink control channel has different values per the first coverage and the second coverage.

12. The transmitting method of claim 10, wherein:
a hybrid automatic repeat request-acknowledgement-radio network temporary identifier (HARQ-ACK-RNTI) for decoding of the first downlink control channel is determined based on a value corresponding to a narrowband subframe number including a plurality of subframes for a narrowband system and a kind of coverage.

13. A transmitting method of a base station, comprising:
scheduling an uplink resource in a first terminal group belonging to a first coverage and a second terminal group belonging to a second coverage larger than the first coverage in different transmission time interval (TTI) units;
generating a response bit map representing whether a reception of a plurality of uplink signals transmitted through the uplink resource succeeds; and
transmitting the response bit map using a first downlink control channel,
wherein the scheduling of the uplink resource includes:
granting a first uplink resource present in a plurality of second narrowband subframes subsequent to a first narrowband subframe to the second terminal group, using a second downlink control channel in the first narrowband subframe including a plurality of subframes for a narrowband system.

14. The transmitting method of claim 13, wherein:
the transmitting of the response bit map includes:
transmitting downlink control information (DCI) including the response bit map to the second terminal group in a third narrowband subframe subsequent to the plurality of second narrowband subframes, using a common search space (CSS) for the first downlink control channel.

* * * * *